() United States Patent  
Arnault et al.

(10) Patent No.: US 11,168,779 B2  
(45) Date of Patent: Nov. 9, 2021

(54) PULLEY DEVICE FOR A TENSIONER ROLLER OR WINDING ROLLER

(71) Applicant: Aktiebolaget SKF, Gothenburg (SE)

(72) Inventors: Benoit Arnault, Saint-Cyr-sur-Loire (FR); Nicolas Tronquoy, Fondettes (FR)

(73) Assignee: Aktiebolaget SKF, Gothenburg (SE)

( * ) Notice: Subject to any disclaimer, the term of this patent is extended or adjusted under 35 U.S.C. 154(b) by 236 days.

(21) Appl. No.: 16/288,273

(22) Filed: Feb. 28, 2019

(65) Prior Publication Data

US 2019/0277389 A1 Sep. 12, 2019

(30) Foreign Application Priority Data

Mar. 6, 2018 (FR) ...................................... 1851904

(51) Int. Cl.
| F16H 57/00 | (2012.01) |
| F16H 7/08 | (2006.01) |
| F16H 55/36 | (2006.01) |
| F16H 7/20 | (2006.01) |
| F16C 19/18 | (2006.01) |

(52) U.S. Cl.
CPC ......... *F16H 57/0031* (2013.01); *F16C 19/18* (2013.01); *F16H 7/08* (2013.01); *F16H 7/20* (2013.01); *F16H 55/36* (2013.01); *F16H 2007/0865* (2013.01)

(58) Field of Classification Search
CPC ................ F16C 19/06; F16C 13/006; F16H 2007/0865; F16H 55/36

USPC .................................................. 474/198, 199  
See application file for complete search history.

(56) References Cited

U.S. PATENT DOCUMENTS

| 1,482,579 | A | * | 2/1924 | Nice | .................... | F16C 13/006 |
| | | | | | | 384/546 |
| 1,627,558 | A | * | 5/1927 | Grunwald | ............. | F16C 13/006 |
| | | | | | | 384/547 |
| 1,845,631 | A | * | 2/1932 | Seelbach | ................. | E05D 13/00 |
| | | | | | | 16/211 |
| 1,848,144 | A | * | 3/1932 | Pribil | ........................ | B60L 5/06 |
| | | | | | | 384/544 |
| 1,903,776 | A | * | 4/1933 | Clark | .................... | F16C 35/077 |
| | | | | | | 29/892 |
| 2,137,987 | A | * | 11/1938 | Smith | ....................... | F16H 7/18 |
| | | | | | | 474/177 |
| 2,198,831 | A | * | 4/1940 | Moyer | .................... | F16H 55/50 |
| | | | | | | 474/177 |

(Continued)

FOREIGN PATENT DOCUMENTS

| DE | 19836191 A1 | 2/2000 |
| DE | 102011077019 A1 | 12/2012 |

(Continued)

*Primary Examiner* — Henry Y Liu  
(74) *Attorney, Agent, or Firm* — Garcia-Zamor Intellectual Property Law; Ruy Garcia-Zamor; Bryan Peckjian

(57) ABSTRACT

A pulley device for a tensioner roller or winding roller of a belt, including a bearing, a pulley mounted to the bearing, a protective flange and a screw. The protective flange having at least one tongue provided with a plastically deformable part that can pass from a first, undeformed configuration for the insertion of the screw to a second, deformed configuration for axially and radially retaining the screw.

8 Claims, 5 Drawing Sheets

(56) References Cited

U.S. PATENT DOCUMENTS

| | | | | |
|---|---|---|---|---|
| 2,315,357 A * | 3/1943 | Smith | F16H 7/18 | 384/547 |
| 2,349,281 A * | 5/1944 | Kendall | F16H 7/20 | 384/547 |
| 2,530,665 A * | 11/1950 | Searles | F16C 13/006 | 384/547 |
| 2,655,813 A * | 10/1953 | Howell | F16H 55/36 | 474/183 |
| 2,669,878 A * | 2/1954 | Nelson | F16H 55/44 | 474/181 |
| 3,367,199 A * | 2/1968 | Dankowski | F16H 55/42 | 474/199 |
| 3,490,285 A * | 1/1970 | Donath | F16H 7/12 | 474/187 |
| 3,767,279 A * | 10/1973 | Hallerback | F16C 35/067 | 384/539 |
| 3,789,683 A * | 2/1974 | Frost | F16H 55/44 | 474/181 |
| 3,825,312 A * | 7/1974 | Allaben, Jr. | F16C 35/073 | 384/538 |
| 3,871,241 A * | 3/1975 | Pestka | F16C 13/006 | 474/135 |
| 3,881,789 A * | 5/1975 | Kornylak | F16C 19/06 | 384/482 |
| 3,918,277 A * | 11/1975 | Nakk | D06F 37/00 | 68/140 |
| 3,990,136 A * | 11/1976 | Hishida | B23P 15/14 | 29/893.37 |
| 4,010,987 A * | 3/1977 | Jasperse | F16C 13/006 | 384/474 |
| 4,033,196 A * | 7/1977 | Maeda | F16H 7/1281 | 474/135 |
| 4,073,551 A * | 2/1978 | Sutowski | F16C 13/006 | 384/501 |
| 4,402,678 A * | 9/1983 | St. John | B23P 11/00 | 474/171 |
| 4,443,210 A * | 4/1984 | Olschewski | F16H 7/1281 | 474/112 |
| 4,457,740 A * | 7/1984 | Olschewski | F16C 13/006 | 474/112 |
| 4,474,562 A * | 10/1984 | Heurich | F16H 7/1281 | 29/517 |
| 4,504,252 A * | 3/1985 | Honma | F16C 13/006 | 474/112 |
| 4,516,962 A * | 5/1985 | Brandenstein | F16H 7/12 | 474/112 |
| 4,518,372 A * | 5/1985 | Dye | F16C 13/006 | 474/199 |
| 4,534,749 A * | 8/1985 | Hans | F16C 13/006 | 474/174 |
| 4,557,708 A * | 12/1985 | Brandenstein | F16C 13/006 | 474/112 |
| 4,568,316 A * | 2/1986 | Veikley | B66D 3/08 | 474/168 |
| 4,571,227 A * | 2/1986 | Colanzi | F02B 67/06 | 384/547 |
| 4,591,352 A * | 5/1986 | Olschewski | F16C 13/006 | 384/505 |
| 4,610,645 A * | 9/1986 | Donn | F16H 7/1281 | 474/112 |
| 4,610,646 A * | 9/1986 | Walter | F16C 13/006 | 474/174 |
| 4,668,209 A * | 5/1987 | Kyoosei | B29C 45/0046 | 474/190 |
| 4,831,705 A * | 5/1989 | Kanemitsu | B21D 53/261 | 29/892.11 |
| 4,917,655 A * | 4/1990 | Martin | F16H 7/1218 | 474/112 |
| 5,630,769 A * | 5/1997 | Schmidt | B60B 5/02 | 474/167 |
| 5,725,448 A * | 3/1998 | Kato | F16C 13/006 | 384/510 |
| 5,728,020 A * | 3/1998 | Muranaka | C10M 115/08 | 474/199 |
| 5,913,743 A * | 6/1999 | Ohta | F16H 7/1218 | 474/112 |
| 6,001,037 A * | 12/1999 | Rocca | F16H 7/1218 | 474/112 |
| 6,010,420 A * | 1/2000 | Niki | F02B 67/06 | 384/475 |
| 6,102,822 A * | 8/2000 | Nakazeki | F16C 13/006 | 384/523 |
| 6,196,720 B1 * | 3/2001 | Nozaki | C10M 107/02 | 384/13 |
| 6,220,982 B1 * | 4/2001 | Kawashima | F16H 55/44 | 474/199 |
| 6,241,257 B1 * | 6/2001 | Hauck | F16C 13/006 | 277/637 |
| 6,270,001 B1 * | 8/2001 | Tadic | B23K 31/02 | 228/245 |
| 6,293,885 B1 * | 9/2001 | Serkh | F16C 13/006 | 474/133 |
| 6,450,689 B1 * | 9/2002 | Takatsu | B29C 45/14311 | 384/449 |
| 6,572,270 B2 * | 6/2003 | Takemura | F16C 13/006 | 384/476 |
| 6,605,574 B2 * | 8/2003 | Asao | F16C 13/006 | 508/376 |
| 6,659,649 B2 * | 12/2003 | Ishiguro | F04B 27/0895 | 384/457 |
| 6,692,393 B2 * | 2/2004 | Fukuwaka | F16C 19/06 | 474/199 |
| 6,860,639 B2 * | 3/2005 | Tabuchi | F16C 35/067 | 384/513 |
| 7,011,593 B2 * | 3/2006 | Schenk | F16C 33/723 | 474/199 |
| 7,041,019 B2 * | 5/2006 | Matsubara | F04B 27/0895 | 474/199 |
| 7,108,623 B2 * | 9/2006 | Cadarette | F16H 55/36 | 474/166 |
| 7,325,974 B2 * | 2/2008 | Tanabe | B32B 7/12 | 384/457 |
| 7,364,522 B2 * | 4/2008 | Miyata | F16H 7/18 | 474/135 |
| 7,435,005 B2 * | 10/2008 | Schmidl | F16C 13/006 | 384/480 |
| 7,448,806 B2 * | 11/2008 | Ishiguro | F04B 27/0895 | 384/417 |
| 7,695,385 B2 * | 4/2010 | Barraud | F16C 35/07 | 474/199 |
| 7,909,701 B2 * | 3/2011 | Ishikawa | F16H 55/36 | 464/32 |
| 7,909,717 B2 * | 3/2011 | Boussaguet | F16H 7/1263 | 474/136 |
| 7,993,228 B2 * | 8/2011 | Nosaka | F16D 3/68 | 474/170 |
| 8,012,053 B2 * | 9/2011 | Filip | F16C 13/006 | 474/144 |
| 8,167,750 B2 * | 5/2012 | Hamada | F16H 7/12 | 474/199 |
| 8,172,056 B2 * | 5/2012 | Barraud | F16D 41/069 | 192/45.1 |
| 8,235,851 B2 * | 8/2012 | Eidloth | F16C 33/6607 | 474/199 |
| 8,258,659 B2 * | 9/2012 | Debrailly | F16C 41/007 | 310/68 B |
| 8,506,434 B2 * | 8/2013 | Harvey | F16H 55/36 | 474/94 |
| 8,512,185 B2 * | 8/2013 | Baer | F02B 67/06 | 474/199 |
| 8,617,016 B2 * | 12/2013 | Dutil | F16H 55/36 | 474/166 |
| 8,651,988 B2 * | 2/2014 | Kapfer | F16C 33/723 | 474/101 |
| 8,790,018 B2 * | 7/2014 | Leuver | B65G 39/09 | 384/546 |
| 8,840,497 B2 * | 9/2014 | Wilson | F16C 13/006 | 474/166 |

(56) References Cited

U.S. PATENT DOCUMENTS

| | | | |
|---|---|---|---|
| 8,905,879 B2* | 12/2014 | Lannutti | F16C 13/006 474/166 |
| 9,028,352 B2* | 5/2015 | Wilson | F16H 7/20 474/166 |
| 9,206,838 B2* | 12/2015 | Mola | F16C 13/006 |
| 9,273,772 B2* | 3/2016 | Ichikawa | F16H 55/38 |
| 9,416,863 B2* | 8/2016 | Schaefer | F16H 55/48 |
| 9,453,571 B2* | 9/2016 | Qin | F16H 55/44 |
| 9,682,621 B2* | 6/2017 | Dell | B60K 25/02 |
| 9,702,399 B2* | 7/2017 | Arnault | F16C 13/006 |
| 9,709,154 B2* | 7/2017 | Albrecht | F16B 1/00 |
| 9,834,083 B2* | 12/2017 | Blessing | B60K 6/405 |
| 9,841,096 B2* | 12/2017 | Bell | B29C 45/1459 |
| 9,927,017 B2* | 3/2018 | van den Heuvel | F16H 55/50 |
| 10,030,758 B2* | 7/2018 | Basile | F16C 35/067 |
| 10,082,200 B2* | 9/2018 | Lescorail | F16H 55/36 |
| 10,088,031 B2* | 10/2018 | Koda | F16H 55/44 |
| 10,132,399 B2* | 11/2018 | Chollet | F16C 35/073 |
| 10,220,432 B2* | 3/2019 | Pan | B23K 20/129 |
| 10,228,051 B2* | 3/2019 | Basile | F16H 55/566 |
| 10,274,013 B2* | 4/2019 | Pallini | F16C 35/067 |
| 10,393,252 B2* | 8/2019 | Liege | F16C 35/063 |
| 10,493,712 B2* | 12/2019 | Capoldi | F16C 19/54 |
| 10,520,029 B2* | 12/2019 | Iino | F16C 33/586 |
| 10,539,185 B2* | 1/2020 | Kunishima | F16C 33/7823 |
| 10,634,189 B2* | 4/2020 | Kunishima | F16C 13/006 |
| 10,662,997 B2* | 5/2020 | Park | F16C 13/02 |
| 2004/0097313 A1* | 5/2004 | Singer | F16C 41/04 474/199 |
| 2004/0178398 A1* | 9/2004 | Miller | F16H 55/44 254/390 |
| 2008/0300077 A1* | 12/2008 | Kapfer | F16C 13/006 474/133 |
| 2009/0191999 A1* | 7/2009 | Joseph | F16H 55/36 474/199 |
| 2009/0298630 A1* | 12/2009 | Mineno | F16C 35/063 474/199 |
| 2011/0152025 A1* | 6/2011 | Wilson | F16C 13/006 474/166 |
| 2015/0125103 A1* | 5/2015 | Ciulla | F16C 33/586 384/512 |
| 2015/0141185 A1* | 5/2015 | Albrecht | F16H 55/36 474/199 |
| 2015/0292603 A1* | 10/2015 | Cherioux | F16H 7/20 474/166 |
| 2016/0327146 A1* | 11/2016 | Lescorail | F16H 55/36 |
| 2016/0356375 A1* | 12/2016 | Chollet | F16C 35/073 |

FOREIGN PATENT DOCUMENTS

| | | |
|---|---|---|
| FR | 3025276 A1 | 3/2016 |
| FR | 3035928 A1 | 11/2016 |
| WO | 2007085333 A1 | 8/2007 |
| WO | 2009089265 A2 | 7/2009 |

* cited by examiner

PULLEY DEVICE FOR A TENSIONER ROLLER OR WINDING ROLLER

CROSS-REFERENCE

This application claims priority to French patent application no. 1851904 filed on Mar. 6, 2018, the contents of which is fully incorporated herein by reference.

TECHNOLOGICAL FIELD

The present invention relates to the field of pulley devices for tensioner rollers or winding rollers that are intended to cooperate with a belt, for example a timing belt or drive belt of a motor vehicle internal combustion engine.

BACKGROUND

Such rollers serve generally to permanently maintain tension in the belt in a given range or to locally modify the path taken thereby. The rollers are thus referred to as tensioner rollers and winding rollers, respectively. In winding rollers, the pulley is rotatably mounted on a threaded screw body via a bearing, the roller then being fixed directly or indirectly to the engine block or to an element of a tensioner roller device, for example an articulated arm or an eccentric.

The bearing generally comprises a fixed inner ring having a bore through which the screw passes, a rotating outer ring surmounted by the pulley, and at least one row of rolling elements interposed between the rings.

Such devices are often equipped with additional protective flanges that help to protect the device from contaminants or spatter originating from the outside environment. The flange also serves as a thrust washer for the head of the screw.

Pulley devices are preferably delivered to motor vehicle equipment manufacturers or to motor vehicle manufacturers in a manner equipped with their screws and their flanges. Therefore, it is desirable for the device to form an assembly that is incapable of being dismantled, is easy to handle and to transport, without any risk of accidental dismantling, and needs to be able to be mounted without any other particular preparation by simply tightening the screw.

It is known from WO 2007/085333 A1 and DE 102011077019 A1 to provide a flange interposed between the head of the screw and the inner ring of the bearing. The flange is directly fixed axially and radially to the inner ring of the bearing and has interior projections for immobilizing the screw axially and preventing it from falling out during transport.

However, in such configurations, the threaded screw has to be inserted into the bore of the flange, deforming the interior projections of the flange. The thread of the screw can be damaged as a result, making the screw unusable or reducing the force keeping it together with the support in which it is screwed. This may result in a need to change the screw, and thus an additional cost and an additional assembly operation, or a risk of the pulley device coming apart from its support during operation, and thus a drop-in performance of the device.

SUMMARY

The present invention aims to remedy this drawback.
More particularly, the present invention aims to provide a pulley device that is resistant to high levels of pollution, is particularly economical, is easy and safe to mount, forming a subassembly that is incapable of being dismantled, and has a smaller axial and radial space requirement.

The invention relates to a pulley device for a tensioner roller or winding roller of a belt, comprising a pulley, a bearing, a protective flange and a screw.

The bearing is provided with a rotating outer ring surmounted by the pulley, and with a fixed inner ring, the rings being coaxial and the bearing having a mounting bore.

The protective flange comprises a substantially radial portion bearing against a front surface of the bearing, and a bore.

The screw comprises a body housed in the bores of the bearing and the flange, and a screw head at one end of the body, the screw head bearing against the substantially radial portion of the flange.

According to the invention, the substantially radial portion of the flange comprises at least one tongue cut into the portion and extending towards the body of the screw. The tongue is provided with a plastically deformable part which extends in a substantially axial direction, and with an inner free end having a bore forming a portion of the bore of the flange. The tongue is configured such that it can pass from a first, undeformed configuration into a second, deformed configuration. The first, undeformed configuration corresponds to a tongue of which the plastically deformable part is in an undeformed initial configuration, the bore of the tongue having an inside diameter strictly greater than the outside diameter of the body of the screw. The second, deformed configuration corresponds to a tongue of which the plastically deformable part is in a deformed configuration against which the head of the screw comes to bear, the tongue then extending radially in its entirety, and the bore of the tongue passing into the immediate vicinity of or into contact with the body of the screw.

According to further advantageous but non-essential features of the invention, taken on their own or in combination:

The bearing is a plain bearing.

The bearing is a bearing having rolling elements, at least one row of rolling elements being radially interposed between the outer and inner rings of the bearing.

The rolling elements are balls.

A cage maintains the circumferential spacing of the rolling elements.

A washer is interposed between the screw head and the substantially radial portion of the flange.

The inner ring of the bearing comprises a bore forming the mounting bore of the bearing.

The bearing comprises an annular spacer interposed between the inner ring and the body of the screw, the spacer being provided with an outer surface fitted in a bore of the inner ring, with a front surface against which the substantially radial portion of the flange comes to bear, and with a bore forming a mounting bore for the bearing in which the body of the screw is housed.

The substantially radial portion of the flange comprises a first radial portion of small diameter that is provided with an inner edge forming the bore of the flange and with an outer edge, a second radial portion of large diameter that is provided with an inner edge and with an outer edge, and an intermediate portion connecting the outer edge of the first radial portion and the inner edge of the second radial portion.

The intermediate portion is cylindrical.
The intermediate portion is frustoconical.

The outer edge of the second radial portion of large diameter extends in the immediate vicinity of the pulley to form a narrow passage.

The flange comprises an axial portion that extends axially from the bore of the substantially radial portion and is housed in the mounting bore of the bearing.

The axial portion is mounted securely in the mounting bore of the bearing.

The axial portion is mounted tightly in the mounting bore of the bearing.

The axial portion comprises retaining means that cooperate with the central mounting bore of the bearing.

The at least one tongue is cut into the first radial portion of small diameter of the flange.

The head of the screw is stepped.

The body of the screw comprises a smooth portion and a threaded portion.

The smooth portion is arranged axially between the screw head and the threaded portion.

The outside diameter of the smooth portion is strictly less than the outside diameter of the threaded portion.

In the second, deformed configuration, the tongue extends radially in the immediate vicinity of or in contact with the smooth portion of the body of the screw.

The plastically deformable part of the tongue comes to bear against the front surface of the inner ring of the bearing.

The plastically deformable part of the tongue comes to bear against the front surface of the spacer of the bearing.

In the first, undeformed configuration, the plastically deformable part is a circumferential boss extending substantially axially away from the bearing.

In the first, undeformed configuration, the plastically deformable part is the free inner end of the tongue having a frustoconical shape and extending substantially axially away from the bearing.

The pulley is made of metal, for example of steel.

The pulley is made of plastics material, for example of polyamide.

The pulley is formed by overmoulding plastics material on the outer ring of the bearing.

The flange is made of metal, for example of steel.

BRIEF DESCRIPTION OF THE DRAWINGS

The present invention will be understood better from reading the detailed description of a number of embodiments, which are given by way of entirely non-limiting example and illustrated in the appended drawings, in which.

DETAILED DESCRIPTION

Figure 1:
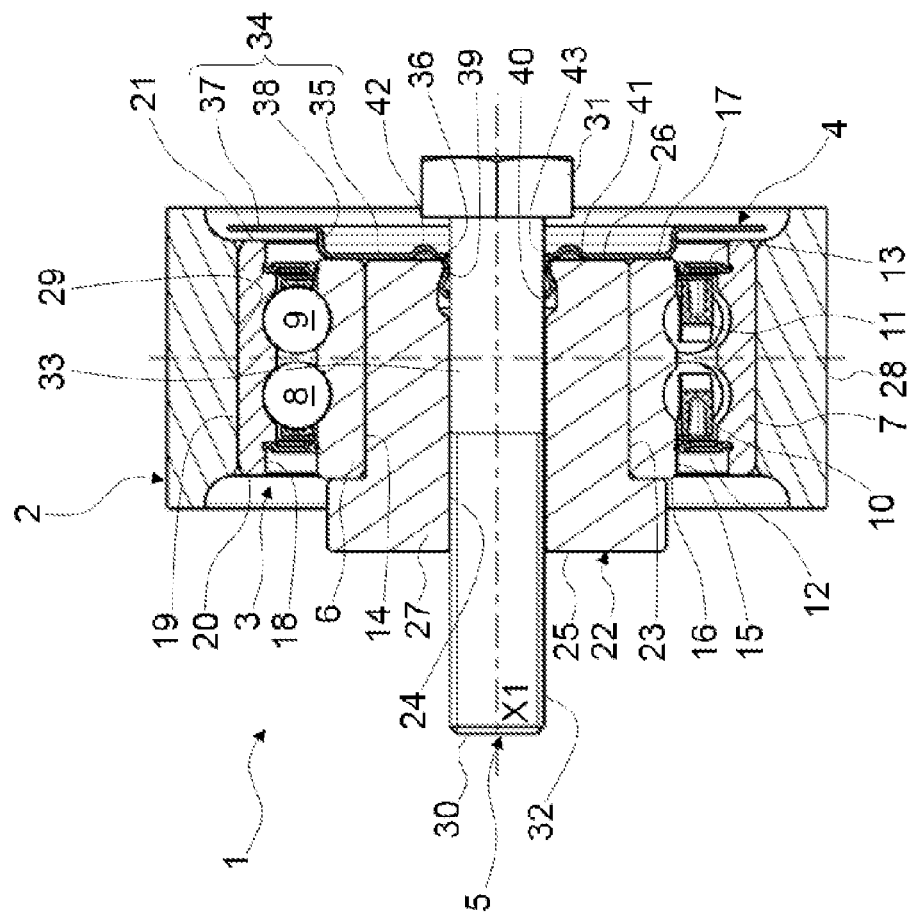
FIG. 1 is a view in axial section of a pulley device according to a first embodiment in a first, undeformed configuration.

As can be seen in FIG. 1, a pulley device for a tensioner roller or winding roller of a belt, bearing the overall reference 1, has a geometric axis X1 and comprises a pulley 2 designed to cooperate with a belt (not shown), a bearing 3, a protective flange 4, and a screw 5.

The bearing 3 comprises a fixed inner ring 6, a rotating outer ring 7, two rows of rolling elements 8 and 9, in the form of balls here, that are disposed between the rings, and cages 10 and 11 that maintain the circumferential spacing of the rolling elements 8 and 9, respectively.

The bearing 3 advantageously comprises on each axial side an annular seal 12, 13 which is fixed to the outer ring 7 to close the radial space between the rings 6, 7 and inside which the rolling elements 8, 9 are housed.

The inner ring 6 and outer ring 7 are concentric. In the exemplary embodiment illustrated, the rings are solid, obtained by machining or grinding with removal of material from metal tubes, bars, forged parts or rolled blanks.

The inner ring 6 comprises a bore 14, an outer cylindrical surface 15 provided with raceways that have, in axial section, a concave internal profile suitable for the rolling elements 8, 9, and two front surfaces 16, 17.

The outer ring 7 comprises a cylindrical bore 18 provided with raceways that have, in axial section, a concave internal profile suitable for the rolling elements 8, 9, an outer cylindrical surface 19 on which the pulley 2 is mounted, and two front surfaces 20, 21.

Alternatively, the bearing may comprise a different number of rows of rolling elements arranged between the outer and inner rings, for example a single row of rolling elements.

Alternatively, the bearing may comprise other types of rolling elements, for example tapered rollers or needles. Alternatively, the bearing may be a plain bearing.

In the embodiment illustrated in FIG. 1, the bearing 3 also comprises a spacer 22. The spacer 22 is annular and is provided with an outer surface 23 fitted in the bore 14 of the inner ring 6, with a bore 24 forming the mounting bore of the bearing 3, and with two front surfaces 25, 26.

The spacer 22 extends axially out of the bearing 3 in the axial direction towards a support on which the pulley device 1 is intended to be mounted. The spacer 22 advantageously comprises a radial rim 27 against which the front face 16 of the inner ring 6 of the bearing 3 can come to bear. On the axially opposite side from this bearing engagement with the inner ring 6, the radial rim 27 comprises a surface for bearing against the support of the device 1. Such a spacer 22 makes it possible to alter the spacing between the pulley device 1 and the support thereof depending on the application.

Alternatively, the bearing 3 does not comprise a spacer, the bore 14 of the inner ring 6 forming the mounting bore of the bearing 3.

The pulley 2 comprises an outer cylindrical surface 28 intended to cooperate with a belt, and an inner surface 29 secured to the outer ring 7. The pulley has a substantially tubular shape and is centered on the central axis X1.

The pulley 2 may advantageously be made of plastics material, and preferably of polyamide, for example of PA6 or PA66. The pulley 2 may advantageously be formed by overmoulding plastics material on the outer ring 7 of the bearing 3. This results in excellent cohesion between these parts. Alternatively, the pulley 2 may be made of metal material, for example of steel, and be mounted tightly on the outer cylindrical surface 19 of the outer ring 7. The pulley 2 may also have other shapes that are optimized depending on the needs of the application.

The screw 5 comprises a body 30 and a head 31 at one end of the body 30. The body 30 comprises a threaded portion 32 and a smooth portion 33 disposed between the threaded portion 32 and the head 31. The body 30 is housed in the mounting bore of the bearing 3, in this case the bore 24 of the spacer 22.

The protective flange 4 comprises a substantially radial portion 34 with a first radial portion 35 of small diameter that is provided with an inner edge forming the bore 36 of the flange 4 and with an outer edge, a second radial portion 37 of large diameter that is provided with an inner edge and with an outer edge, and a cylindrical intermediate portion 38 connecting the outer edge of the first radial portion 35 and the inner edge of the second radial portion 37. Alternatively, the intermediate portion 38 may be frustoconical.

The outer edge of the second radial portion 37 of large diameter extends in the immediate vicinity of the pulley 2 to form a narrow passage that reduces the risk of outside contaminants intruding into the vicinity of the bearing 3, and more particularly the bearing surfaces between the rolling elements 8, 9 and the inner ring 6 and outer ring 7. Of course, the seals 12, 13 are involved in the sealing and further reduce the risk of harmful intrusion, the flange 4 forming a first barrier in an environment with high levels of pollution.

The first radial portion 35 comes to bear against the front surface 17 of the inner ring 6 and the front surface 26 of the spacer 22 situated opposite the rim 27, and thus of the support on which the device 1 is intended to be mounted.

The head 31 of the screw 5 has a relatively flat surface that comes to bear against the first radial portion 35 of the flange 4, the first radial portion 35 being axially jammed between the head 31 of the screw 5 and the inner ring 6 of the bearing 3. According to a variant that is not illustrated, a washer may be interposed between the screw head and the substantially radial portion of the flange.

The flange 4 also comprises an axial portion 39 extending axially from the inner edge of the first radial portion 35. The axial portion 39 is housed and secured in the mounting bore 24 of the bearing 3.

In the embodiment illustrated in FIG. 1, the bore 24 of the spacer 22 is provided with a circumferential groove 40, the axial portion 39 being radially deformed to be partially housed in the circumferential groove 40. The flange 4 is kept axially and radially together with the bearing 3 via its axial portion 39 that cooperates with the walls of the circumferential groove 40 provided in the spacer 22. Alternatively, the circumferential groove may be provided in the bore of the inner ring of the bearing if the latter does not have a spacer.

In an alternative that is not shown, the axial portion of the flange may be mounted tightly in the bore of the bearing. In other variants, the axial portion is mounted securely in the mounting bore of the bearing by any other suitable means, for example by adhesive bonding.

Figure 2:
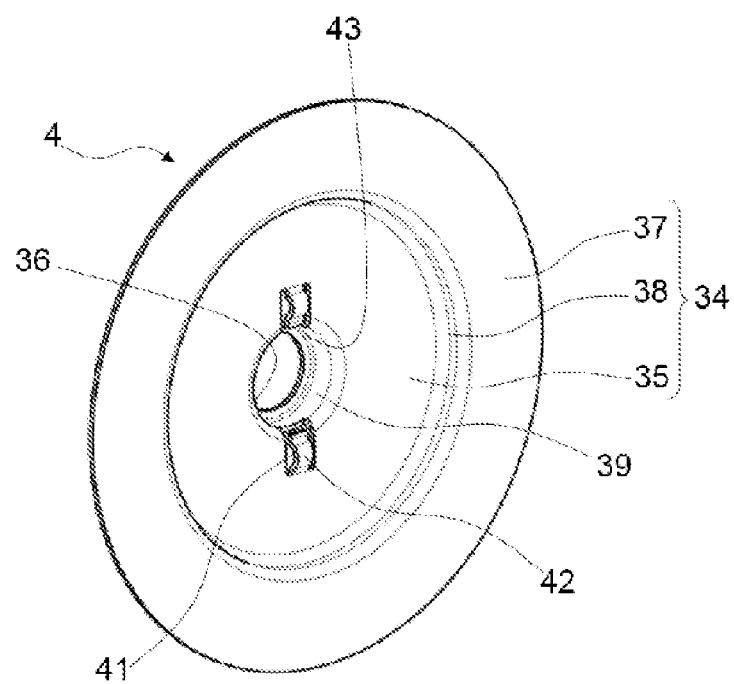
FIG. 2 is a perspective front view of a flange for the pulley device in FIG. 1.

As illustrated in FIG. 2, the substantially radial portion 34 of the flange 4 comprises two tongues 41 cut into the portion 34.

The tongues 41 are radially opposite one another and are identical. Alternatively, the flange 4 may comprise a single tongue, or more than two.

Each of the tongues 41 extends towards the body 30 of the screw 5. The tongues are each provided with a plastically deformable part 42 that extends in a substantially axial direction, and with an inner free end 43 having a bore that forms a portion of the bore 36 of the flange 4.

According to a first embodiment illustrated in FIGS. 1 and 2, the plastically deformable part 42 of each of the tongues 41 is a circumferential boss that extends substantially axially away from the bearing 3.

Figure 3:
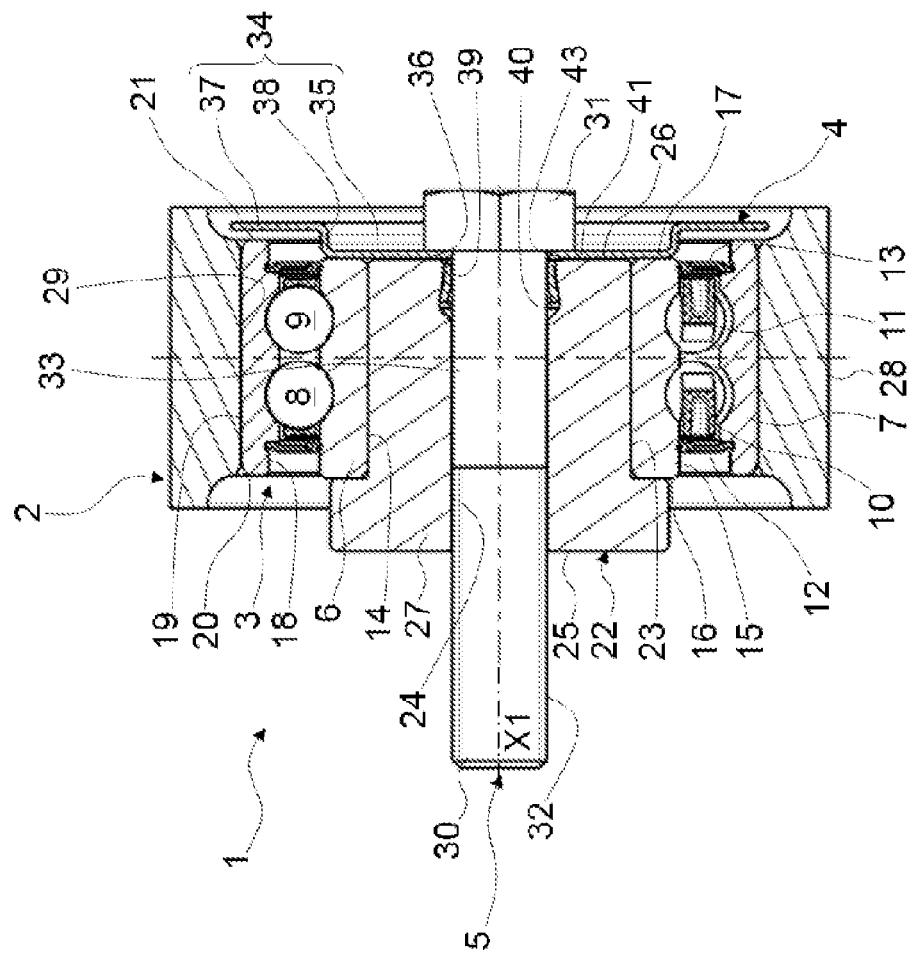
FIG. 3 is a view in axial section of the pulley device according to the first embodiment in a second, deformed configuration.

According to the invention, the tongues 41 are configured such that they can pass from a first, undeformed configuration, illustrated in FIG. 1, to a second, deformed configuration, illustrated in FIG. 3.

According to the first embodiment of the invention, in the first, undeformed configuration shown in FIGS. 1 and 2, the boss 42 of each of the tongues is in an undeformed initial configuration, the boss 42 pointing axially towards the head 31 of the screw 5. The inner free end 43 of each tongue has an inside diameter strictly greater than the outside diameter of the body 30 of the screw 5, and more particularly of the threaded portion 32.

When the flange 4 is mounted securely on the bearing 3, the substantially radial portion 34 provided with the tongues 41 comes to bear against the front surfaces of the inner ring 6 and of the spacer 22 of the bearing. The flange 4 defines a bore 36 formed partially by the inner edge of the substantially radial portion and by the inner free ends 43 of the tongues 41. Since the inside diameter of the bore 36 of the flange 4 is strictly greater than the outside diameter of the body 30 of the screw 5, the body 30 can be inserted into the bore 36 without there being the slightest contact therebetween. The body 30 is then inserted into the mounting bore 24 of the bearing 3 until the head 31 of the screw 5 comes to bear against the bosses 42 of the tongues 41.

By virtue of the invention, the screw 5 can thus be inserted into the device 1 in this first configuration easily and without any risk of damaging the thread 32. The flange 4 centers the screw 5, ensuring that the screw 5, for the one part, and the pulley 2 and the bearing 3, for the other part, are centered, this potentially making it easier to screw the screw 5 into a support provided with a tapped hole for this purpose.

According to the first embodiment of the invention, in the second, deformed configuration shown in FIG. 3, an axial force is applied to the screw 5 in the insertion direction thereof. The force is such that the head 31 exerts an axial force on the bosses 42 of the tongues 41 and thus deforms them until they are completely flattened against the front surface 26 of the spacer 22. The force can be applied via a washer between the screw head and the flange, if appropriate. The tongues 41 thus extend entirely radially. The axial extension of the boss 42 of each tongue 41 is converted in the radial direction, the radial length of each tongue 41 thus being increased. The inner free ends 43 of the tongues 41 thus pass into the immediate vicinity or into contact with the body 30 of the screw 5.

Advantageously, the screw 5 is configured such that the tongues 41 extend towards the smooth portion 33 of the body 30. In this way, any risk of contact with the thread is prevented.

By virtue of the invention, the screw 5 is retained axially and radially by the tongues 41 of the flange in the second configuration. As a result, the pulley device 1 forms an assembly that is incapable of being dismantled and is made up of the pulley 2, the bearing 3 with the spacer 22, the flange 4 and the screw 5. Such a device can be easily handled, transported, and then installed on an assembly line without any risk of parts being lost, then installed on a support by screwing the screw into a tapped hole for this purpose without any other particular preparation.

The flange 4 can be manufactured economically by cutting out and stamping a blank made of sheet metal, for example steel.

In an alternative that is not illustrated, the smooth part 33 of the body 30 of the screw 5 can have an outside diameter strictly less than the outside diameter of the threaded portion 32 to form an annular groove in which the free ends 43 of the tongues 41 are housed. This arrangement makes it possible to improve the axial retention of the screw.

As can be seen in FIG. 3, the head 31 of the screw 5 is flush with the radial plane defining the overall exterior size of the pulley 2. Thus, the screw 5 and the flange 4 do not increase the overall size of the assembly, the overall size remaining that defined by the pulley 2 on the outer side of the device 1.

Figure 4:
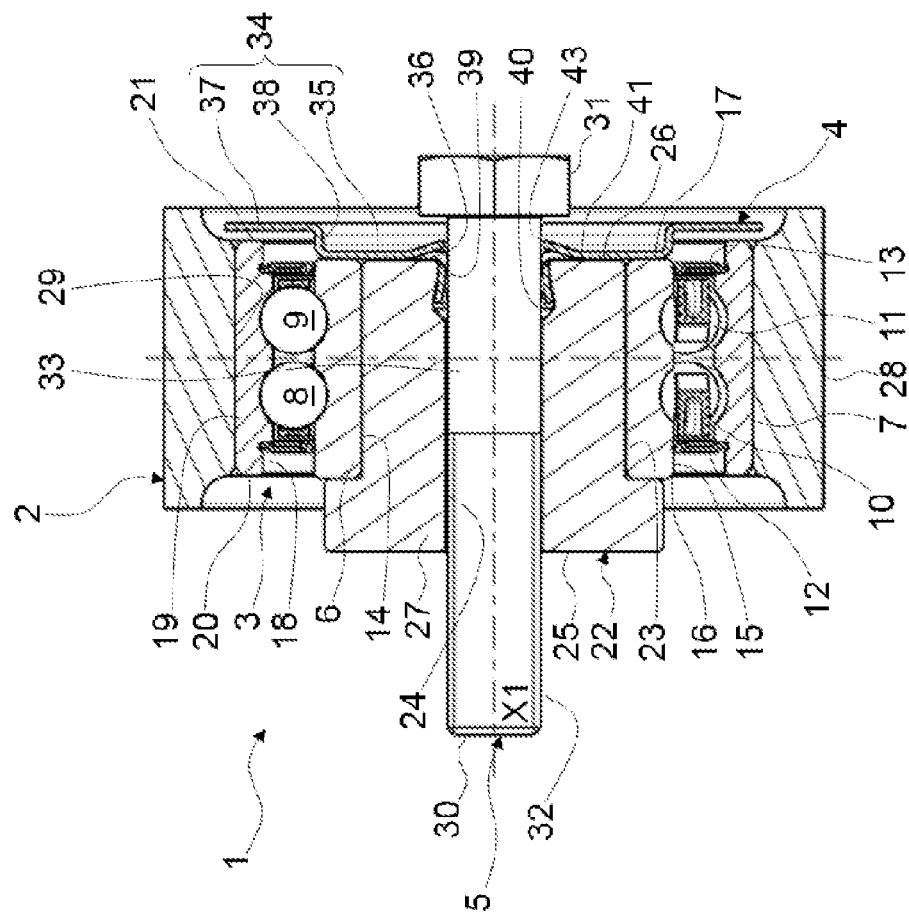
FIG. 4 is a view in axial section of a pulley device according to a second embodiment in a first, undeformed configuration.
Figure 5:
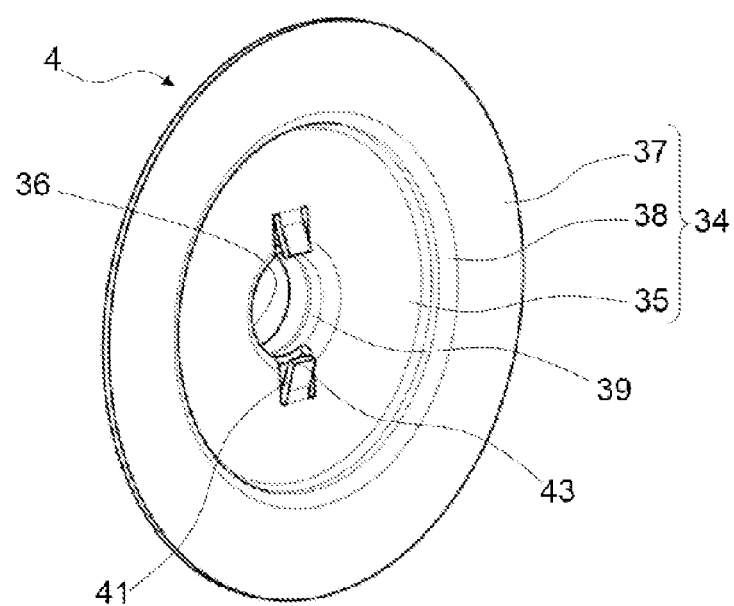
FIG. 5 is a perspective front view of a flange for the pulley device in FIG. 4.

According to a second embodiment of the invention, in a first, undeformed configuration shown in FIGS. 4 and 5, the plastically deformable part 42 of each of the tongues 41 is the inner free end 43 of the tongue 41 having a frustoconical shape and extending substantially axially towards the head 31 of the screw 5.

In this first configuration, the frustoconical inner free end 43 of each tongue 41 has an inside diameter strictly greater than the outside diameter of the body 30 of the screw 5, and more particularly of the threaded portion 32, to allow contact-free insertion of the body 30 of the screw 5 into the flange 4.

The tongues 41 can pass into a second, deformed configuration following the flattening of the frustoconical inner free ends 43 by application of an axial force via the head 31 of the screw 5. The pulley device 1 is then in a configuration similar to the one illustrated in FIG. 3, the tongues extending in the immediate vicinity of or in contact with the body 30 of the screw 5 in order to ensure that the latter is axially and radially retained.

Moreover, all or only some of the technical features of the various embodiments can be combined with one another. Thus, the pulley device can be adapted in terms of cost, performance and ease of use.

What is claimed is:

1. A pulley device for a tensioner roller or winding roller of a belt, comprising:
    a pulley,
    a bearing having a rotating outer ring mounted to the pulley, and a fixed inner ring, the rings being coaxial and the bearing having a mounting bore,
    a protective flange having a substantially radial portion bearing against a front surface of the bearing, and a bore,
    a screw having a body housed in the bores of the bearing and the flange, and a screw head at one end of the body, the head bearing against the substantially radial portion of the flange, wherein
    the substantially radial portion of the flange comprises at least one tongue cut into the portion and extending towards the body of the screw, the tongue being provided with a plastically deformable part that extends in a substantially axial direction, and with an inner free end having a bore forming a portion of the bore of the flange, wherein
    the tongue can pass from a first, undeformed configuration into a second, deformed configuration, wherein the first, undeformed configuration corresponds to a tongue of which the plastically deformable part is in an undeformed initial configuration, the bore of the tongue having an inside diameter strictly greater than the outside diameter of the body of the screw, and wherein
    the second, deformed configuration corresponds to a tongue of which the plastically deformable part is in a deformed configuration against which the head of the screw comes to bear, the tongue then extending radially in its entirety, and the bore of the tongue passing into the immediate vicinity of or into contact with the body of the screw.

2. The pulley device according to claim 1, wherein the flange comprises an axial portion that extends axially from the bore of the substantially radial portion and is housed in the mounting bore of the bearing.

3. The pulley device according to claim 1, wherein the bearing comprises an annular spacer interposed between the inner ring and the body of the screw and provided with an outer surface fitted in a bore of the inner ring, with a front surface against which the substantially radial portion of the flange comes to bear, and with a bore forming a mounting bore for the bearing in which the body of the screw is housed.

4. The pulley device according to claim 3, wherein the plastically deformable part of the tongue comes to bear against the front surface of the spacer of the bearing.

5. The pulley device according to claim 1, wherein the body of the screw comprises a smooth portion and a threaded portion, the smooth portion being arranged axially between the screw head and the threaded portion.

6. The pulley device according to claim 5, wherein, in the second, deformed configuration, the tongue extends radially in the immediate vicinity of or in contact with the smooth portion of the body of the screw.

7. The pulley device according to claim 1, wherein, in the first, undeformed configuration, the plastically deformable part is a circumferential boss extending substantially axially away from the bearing.

8. The pulley device according to claim 1, wherein, in the first, undeformed configuration, the plastically deformable part is the free inner end of the tongue having a frustoconical shape and extending substantially axially away from the bearing.

* * * * *